United States Patent [19]

Ludwig

[11] 4,434,761
[45] Mar. 6, 1984

[54] FUEL FLOW REGULATOR CONTROL FOR A DIESEL ENGINE WITH EXHAUST GAS DRIVEN TURBOCHARGER

[75] Inventor: George C. Ludwig, Marion, S.C.
[73] Assignee: Tom McGuane Industries, Inc., Madison Heights, Mich.
[21] Appl. No.: 222,098
[22] Filed: Jan. 2, 1981
[51] Int. Cl.³ .............................................. F02D 1/06
[52] U.S. Cl. .................................. 123/383; 123/564; 123/198 D; 60/605
[58] Field of Search ........... 123/383, 382, 389, 198 D, 123/198 DB, 559, 564; 60/605

[56] References Cited

U.S. PATENT DOCUMENTS

| | | | |
|---|---|---|---|
| 2,858,821 | 11/1958 | Isley | 123/382 |
| 3,435,813 | 4/1969 | Wagner | 123/383 |
| 3,795,233 | 3/1974 | Crews et al. | 123/383 |
| 4,157,701 | 6/1979 | Holtrop | 123/383 |
| 4,228,774 | 10/1980 | Ritter et al. | 123/383 |

FOREIGN PATENT DOCUMENTS 2067663A 7/1981 United Kingdom ................ 123/383

Primary Examiner—Ira S. Lazarus
Assistant Examiner—Magdalen Moy
Attorney, Agent, or Firm—Barnes, Kisselle, Raisch, Choate, Whittemore & Hulbert

[57] ABSTRACT

A fuel flow regulator for an internal combustion engine having an exhaust gas turbocharger is disclosed. The fuel flow regulator responds to intake manifold pressure. Thus the fuel flow regulator increases the maximum fuel flow to the internal combustion engine from a first maximum predetermined fuel flow rate when the intake manifold pressure is at a first predetermined intake air pressure level to a second predetermined maximum fuel flow rate when the intake air manifold pressure is at a second predetermined intake air pressure level. Additionally, the fuel flow regulator decreases fuel flow to a third maximum fuel flow rate which is less than the first predetermined maximum fuel flow rate when the intake manifold pressure is greater than the second predetermined intake air pressure level. Therefore, the fuel flow regulator protects the internal combustion engine from overboost of the engine by the turbocharger and for overfueling the engine.

8 Claims, 7 Drawing Figures

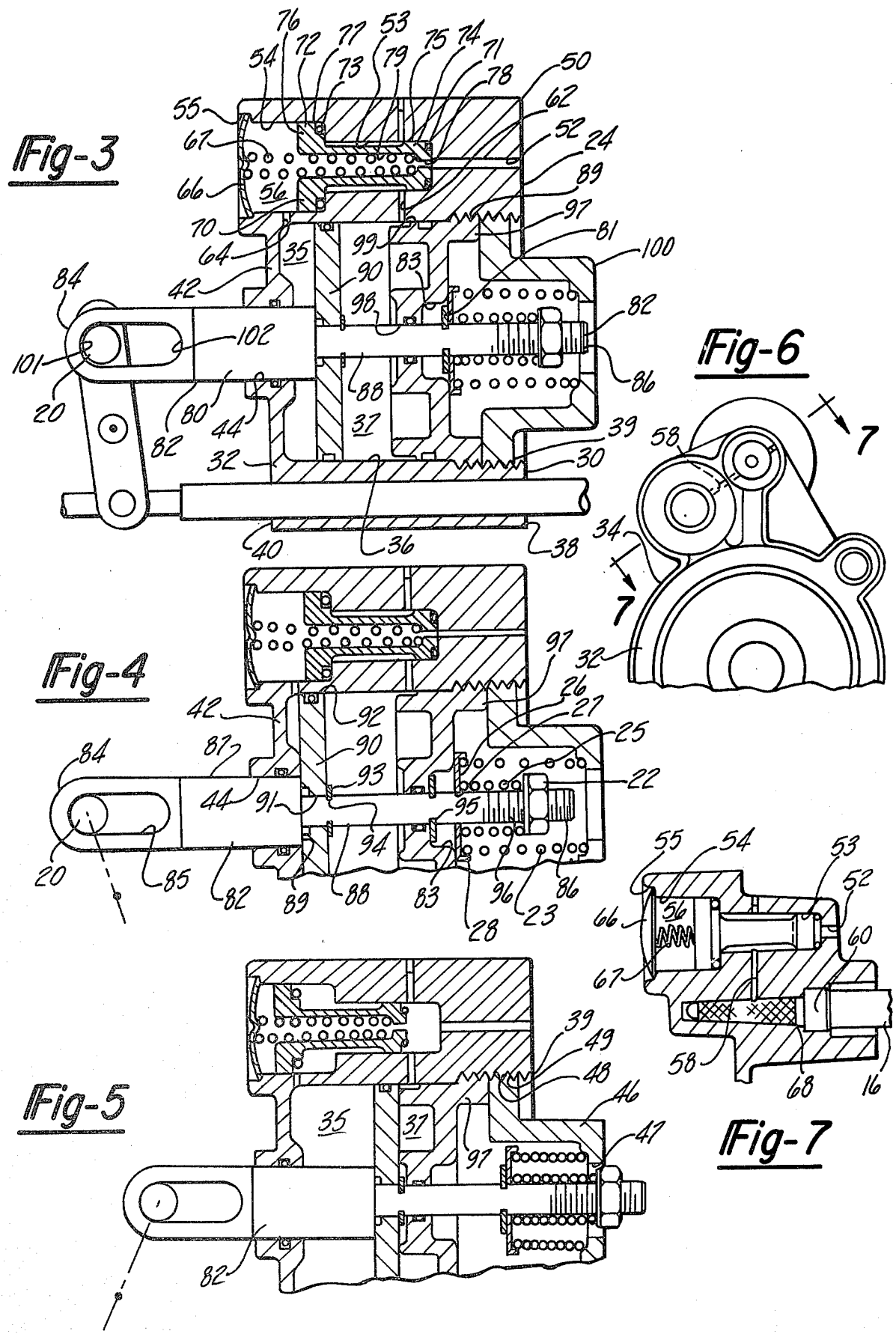

FUEL FLOW REGULATOR CONTROL FOR A DIESEL ENGINE WITH EXHAUST GAS DRIVEN TURBOCHARGER

FIELD OF THE INVENTION

The present invention relates to a fuel control arrangement and, more particularly, for a fuel flow regulator for an internal combustion engine having an exhaust gas turbocharger. The fuel flow regulator is responsive to the charging pressure of the turbocharger to protect the internal combustion engine from overfueling.

BACKGROUND OF THE INVENTION

There are many known prior art arrangements for limiting the charging air pressure of an internal combustion engine supplied with a turbocharger, especially in aircraft applications. The basic concern with respect to aircraft applications is maintaining a constant intake manifold pressure at all altitudes of flight in order to insure continuous maximum operation of the aircraft engine. In aircraft applications, it is important to maintain a constant manifold pressure as a function of either manifold temperature, engine oil pressure and, of course, the ambient surrounding conditions in order to maintain a safe maximum output of the engine while the aircraft is operating. In addition, aircraft systems are designed such that there is a manual override of the turbochargers in order to permit a pilot to exercise his discretion with regard to its operation. As a result, aircraft systems are designed with a multiplicity of levers in order to enable manual override of the various regulating devices.

U.S. Pat. No. 2,776,720, issued Jan. 8, 1957; U.S. Pat. No. 2,833,355 issued May 6, 1958; and U.S. Pat. No. 2,901,885 issued Sept. 1, 1959 to F. C. Reggio, are typical examples of the aforementioned type of aircraft engine controlled devices which are utilized to maintain constant manifold pressure as a function of other engine and ambient parameters. U.S. Pat. No. 2,710,522 issued June 14, 1955 to Jorgensen and U.S. Pat. No. 2,540,916 disclose turbochargers for aircraft applications wherein an electrical portion and controls systems are utilized sequentially for controlling throttle position and compressor speed.

Miller, in U.S. Pat. No. 3,015,934 issued Jan. 9, 1962, teaches the control of the inlet or the exhaust valve opening as a function of the load on the engine. Miller accomplishes this by delaying either the inlet or the exhaust valve closing in one embodiment so as to allow the turbocharger to pick up speed at full load and maintain constant air/fuel ratios to the engine.

Powell et al, in U.S. Pat. No. 3,386,427 issued June 4, 1968, is concerned with a fuel system wherein the system meters the fuel delivered to the turbocharger through the use of an engine driven fuel pump and a regulating device to regulate the delivery of fuel as a function of the throttle position. Manual controls are used to override the metering system in order to provide a throttle control for economy cruising or idle cut-off by the pilot. Powell also teaches a device for controlling the turbocharger speed which is responsive to the discharge pressure of the throttle with an atmospheric pressure control override at the critical altitude.

U.S. Pat. No. 3,487,634 to May et al, issued Jan. 6, 1970, discloses an internal combustion engine with a turbocharger and a fuel control system. This system, when matched with a transmission having a relatively small number of speed change ratios therein, provides enhanced vehicle performance for the generation of substantially constant horsepower output of the engine throughout the normal operating range of the engine.

Nettel, in U.S. Pat. No. 2,620,621 issued Dec. 9, 1952, teaches a diesel engine having a control auxillary burner means to supplement the exhaust gas feed to the turbocharger so that the engine is able to deliver greater crankshaft torque at lower speeds than at higher speeds. At the same time, the device delivers a constant power output within a wide speed range without the use of speed changing devices.

The patent to Udale, U.S. Pat. No. 2,578,028 issued Dec. 11, 1951, discloses a two-stage turbocharger to obtain short period increases in power without exceeding the temperature limits of the turbine.

Lloyd, in U.S. Pat. No. 4,005,579 issued Feb. 1, 1977, is directed to the problem of diverting exhaust flow at the maximum engine speed and thereby avoids overdrive of the turbine and compressor. Thus, Llyod avoids excessive manifold pressure at part-throttle engine conditions.

The fuel control system taught by Schueler et al, in U.S. Pat. No. 3,981,285 issued Sept. 21, 1976, provides an excess fuel quantity during engine acceleration through the use of manifold pressure actuated control units. The control units consist of diaphram valves wherein one valve is throttled. This results in a net differential control force tending to increase the fuel supply to the injection nozzles of the engine injection system while the manifold pressure is rising.

None of the above cited references, however, is directed to the problem of providing a fuel cut-off to the internal combustion engine for a given overboost pressure situation.

The patent to Drayer, U.S. Pat. No. 3,049,865 issued Aug. 21, 1962, is directed to the problem of overcoming the time lag required by the compressor of the turbocharger to supercharge the air. Drayer provides a control system which includes a bypass conduit extending between the compressor inlet conduit and the compressor outlet conduit. In addition, a throttle valve means is suitably disposed in the bypass conduit and compressor inlet conduit and operatively connected to open and close together. This valve mechanism allows the compressor to run at full speed at all times and during part throttle operation, a portion of the air is diverted through this valve mechanism. When supercharging is required, the high rotational speed of the compressor permits the compressor to supercharge the air without the usual time lag which is experienced.

The only other known prior art device having a fuel cut-off valve actuated by an overspeed governor is the patent to Poole, U.S. Pat. No. 2,609,656 issued Sept. 9, 1952. Poole is directed to a gas turbine power plant with an arrangment for cutting of the fuel supply to the gas turbine burner in the event of the turbine overspeeding. Another feature of Poole's device is that it cuts off all fuel flow to the power plant when the turbine exceeds a predetermined speed.

In summary, therefore, none of the above identified prior art devices provides a mechanism for controlling fuel flow to an internal combustion engine having a turbocharger such that fuel flow rate to the engine increases in response to increases in intake manifold pressure up to a predetermined pressure level and such that the fuel flow to the engine is decreased to a idle cut-off fuel flow rate when the intake manifold pressure is greater than the predetermined pressure level so as to protect the reciprocating engine from overpressurization of the engine by the turbocharger.

SUMMARY OF THE INVENTION

The present invention is directed to a pneumatically operated valve which is responsive to intake manifold pressure such that fuel flow to the reciprocating engine is increased from a first maximum fuel flow rate to a second maximum fuel flow rate in response to increasing intake manifold pressure from a first predetermined intake air pressure level up to a second predetermined intake air pressure level. Above the second predetermined intake air manifold pressure, the fuel flow rate is decreased to the idle fuel flow until manifold pressure decreases below the second predetermined intake air pressure level the fuel flow rate is then allowed to follow increasing intake manifold pressure as previously described to protect the reciprocating engine from overpressurization of the engine by the turbocharger.

The present invention provides a control device for internal combustion engines having an intake manifold and a turbocharger connected to the intake manifold. The turbocharger increases the air pressure in the intake manifold. A fuel control mechanism for regulating the fuel flow to the internal combustion engine is also provided. A governor mechanism is connected to the fuel control for controlling the fuel control in response to engine speed. In addition, an operator actuating mechanism is connected to the fuel control mechanism for controlling the fuel flow mechanism in response to operator input or power demand. The control device includes a valve mechanism having an inlet port and a first outlet port. A second outlet port is also provided adjacent to but spaced away from the first outlet port. A first vent port is mounted adjacent to the first outlet port. The inlet port is connected to the intake manifold for sensing intake manifold air pressure. The valve mechanism is further connected to the intake port and to the first outlet port and the second outlet port to the second vent port in a first predetermined position when the manifold pressure is below a second predetermined intake manifold air pressure level. In addition, the valve mechanism further connects the intake port to the second outlet port and the first outlet port to the first vent port in a second predetermined position when the manifold pressure is at the second predetermined intake manifold air pressure level. Additionally, a mechanism is provided which is connected to the first and second outlet ports for controlling fuel flow from the fuel control mechanism to the internal combustion engine in response to manifold pressure. Thus, when the valve mechanism is in the first predetermined position, the controlling mechanism increases fuel flow in response to increasing intake manifold pressure from a first predetermined maximum fuel flow rate to a second predetermined maximum fuel flow rate when the intake manifold air pressure is below the second predetermined intake manifold air pressure level. Finally, when the valve mechanism is in the second predetermined position, the controlling mechanism decreases the fuel flow to a third predetermined maximum fuel flow rate in response to increasing manifold pressure when the intake manifold pressure is above the second predetermined intake manifold air pressure level. Thus, when the intake manifold pressure is above the second predetermined intake manifold air pressure, the device overrides the governor mechanism input and also overrides the operator actuating mechanism input to protect the internal combustion engine from overpressurization of the engine by the turbocharger.

The present invention also provides a system which is used in combination with a reciprocating engine having a power transmission mechanism operatively connected therewith. The reciprocating engine includes an intake air manifold, a turbocharger mechanism connected to the intake air manifold. The turbocharger mechanism increases pressure in the intake air manifold. A fuel control mechanism is also provided for regulating fuel flow to the reciprocating engine. A governor mechanism is connected to the fuel control mechanism and an operator actuating mechanism is connected to the fuel control mechanism. Finally, a valve mechanism is connected to the intake manifold for responding to increasing intake manifold pressure. Thus, the valve mechanism increases fuel flow from a first predetermined maximum fuel flow rate when the intake manifold pressure is below a first predetermined pressure level to a second predetermined maximum fuel flow rate when the intake manifold pressure is less than a second predetermined pressure level. In addition, the valve mechanism decreases fuel flow to a third maximum fuel flow rate when the intake manifold pressure is greater than the second predetermined pressure level so as to protect the reciprocating engine from overboost of the engine by the turbocharger.

It is therefore a primary object of the present invention to provide a control device for an internal combustion engine with fuel control means and turbocharger means so that below a predetermined air pressure, the fuel flow to the internal combustion engine is controlled in response to manifold pressure from a first maximum fuel flow rate to a second maximum fuel flow rate, however, when the intake manifold air pressure is above a second predetermined manifold air pressure level, the fuel flow is decreased to a third maximum fuel flow rate in response to increasing manifold air pressure when the intake manifold air pressure is above the second predetermined intake manifold air pressure level.

It is yet another object of the present invention to provide a control device which protects the turbocharged reciprocating engine from turbocharger overboost by reducing fuel flow when the manifold air pressure is above a second predetermined manifold pressure level to the idle cut-off fuel flow rate.

It is yet still another object of the present invention to provide a system for controlling fuel flow to a turbocharged reciprocating engine such that the fuel flow to the engine is decreased to the idle cut-off fuel flow rate when the intake manifold pressure is greater than the second predetermined manifold air pressure level to protect the reciprocating engine from overboost of the engine by the turbocharger.

These and other objects of the present invention will become apparent by reference to the drawings, specification and claims.

BRIEF DESCRIPTION OF THE DRAWINGS

FIG. 3 is a sectional side view of the control device according to my invention with the manifold pressure at the first predetermined intake manifold air pressure level and the maximum fuel flow rate limited to the first maximum fuel flow rate by the shaft;

FIG. 4 is a side sectional view of the control device according to my invention at the second predetermined intake manifold air pressure level and the maximum fuel flow rate limited to the second maximum fuel flow rate by the shaft;

FIG. 5 is a sectional side view of the control device according to my invention with the intake manifold pressure above the second predetermined intake manifold air pressure level and the maximum fuel flow rate limited;

FIG. 6 is a partial end view of FIG. 4; and

FIG. 7 is a partial sectional view along 7—7 of FIG. 6.

DESCRIPTION OF THE PREFERRED EMBODIMENT

Figure 1:
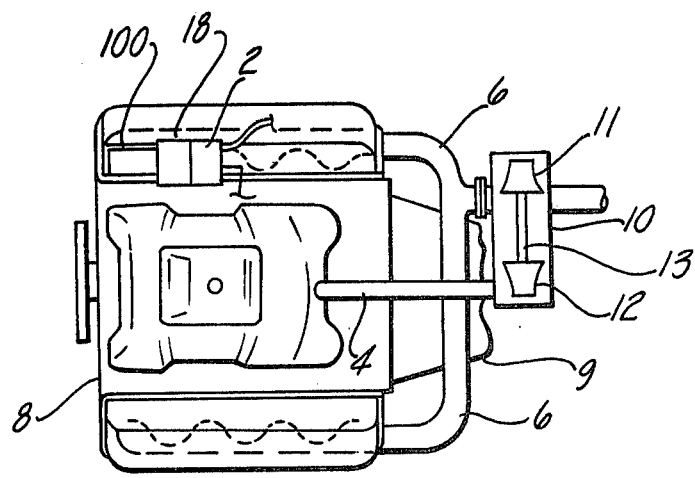
FIG. 1 is a perspective view of an internal combustion engine having the turbocharger overboost protection of my present invention.

Referring to FIG. 1, the control device, according to my invention, is generally designated by the numeral 100. The control device 100 is mounted adjacent to the engine governor 18 which is mounted adjacent to the fuel control injection means 2 which is operatively connected by means of gears (not shown) to the engine 8. The engine 8 includes intake means 4 and exhaust means 6. The engine further is coupled to power transmission means 9 to provide power to load means (not shown). The engine 8 may be of any suitable type which is either a two cycle or four cycle reciprocating engine. It is preferrably a two cycle diesel. However, those skilled in the art will recognize that the device according to my invention may be applied to stratified charge engines, spark ignition engines, or any other reciprocating engine utilizing a turbocharger and fuel injection means.

The turbocharger 10 has a turbine portion 11 and a compressor portion 12 with a common shaft 13 connecting the turbine portion with the compressor portion. The turbine portion is connected to the exhaust means 6 and the compressor portion 12 is connected to the intake means 4. The turbocharger 10 is of conventional design and has a compressor portion which includes a centrifugal impeller with a plurality of blades forming passages extending axially into the impeller and radially outwardly thereof (not shown). A collector diffuser ring (not shown) surrounds the impeller to receive the air drawn into the impeller passages and discharge the air radially therefrom as the impeller is rotated by the turbine. The turbine portion 11 may be of the centripetal type and has a torus disposed around the periphery of a rotor having radially inwardly and axially extending passages (not shown). The torus is equipped with guide vanes (not shown) directing engine exhaust gases from the torus, which is connected with the exhaust means 6 into the passages to cause rotation of the rotor. The guide vanes may be adjustable or stationary according to the desires of the manufacturer.

Figure 2:
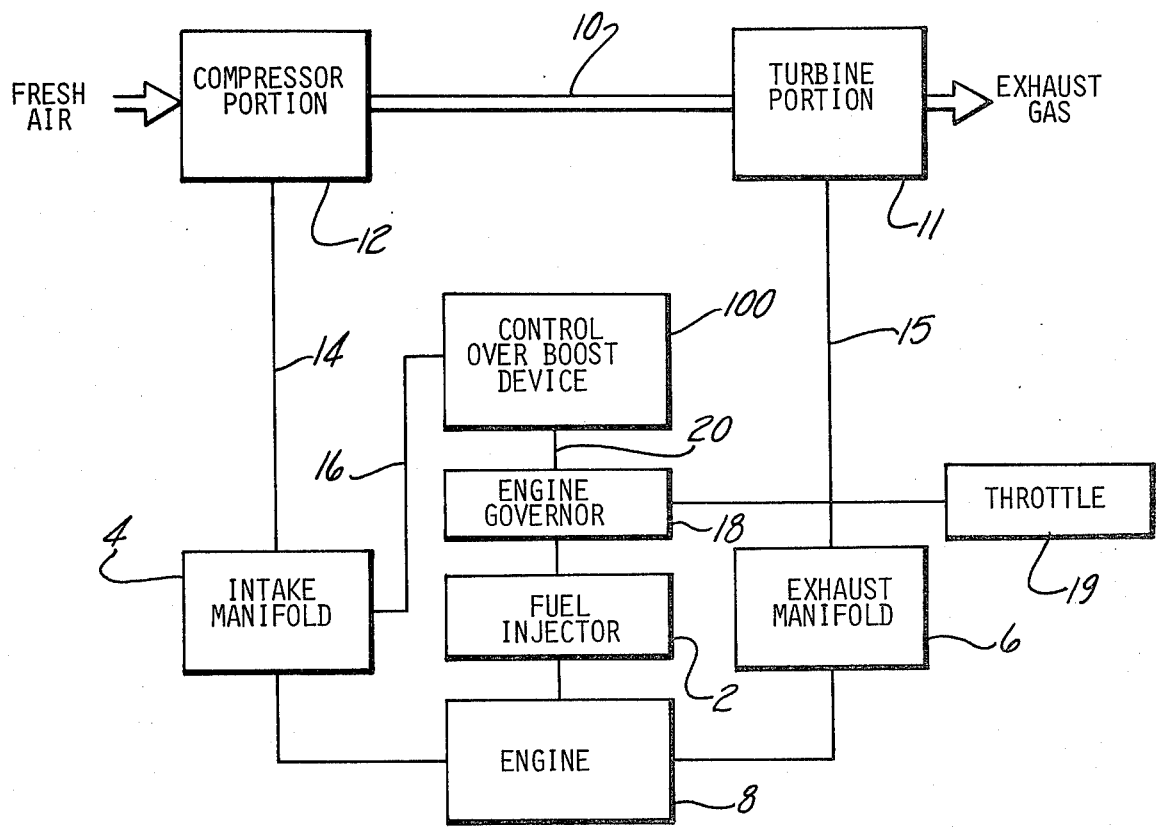
FIG. 2 is a diagramatic depiction of the turbo overboost protection system according to my invention.

As is shown in FIG. 2, the control device 100 is connected to the intake means or manifold 4 of the engine 8 by means of a conduit 16. The compressor portion 12 of the turbocharger 10 is connected to the intake manifold 4 by a conduit 14 and the exhaust means or manifold 6 is connected to the turbine portion 11 of the turbocharger 10 by means of a conduit 15. The control device 100 has a shaft 20 which interacts with the fuel injection control 2 as will be described herein later. The engine governor 18 is connected by a mechanism (not shown) which senses engine speed and regulates the fuel control injection means 2 as is conventional. The governor 18 is also connected to throttle means 19 which responds to an operator control signal by well known conventional means.

As is shown in FIGS. 3-7, the control device 100 includes a valve means 24. The valve means 24 comprises slide valve means 70, fuel flow controlling means 80 and a housing 30.

The housing 30 includes a cylindrical body portion 32 and body portion extension 50 mounted to the outside diameter 34 of the cylindrical body portion 32. The cylindrical body portion 32 has a cylindrical passage 36 extending from one end 38 towards the opposite end 40. At the opposite end 40 is web portion 42 having an opening 44 centrally disposed with respect to the cylindrical passage 36. The opening 44 is also connected to the cylindrical passage 36 of the cylindrical body portion 32.

The body portion extension 50 has two parallel cylindrical passages 56, 60 which are adjacent but spaced apart to one another. The first passage 56 includes a first opening 52 which extends from one end to the opposite end of the body portion extension 50. A counterbore 53 is centrally disposed with respect to the first opening 52 and a second counterbore 54 is centrally disposed with respect to the first counterbore 53 and the first opening 52. Finally, a third counterbore 55 formed adjacent to the opposite end is centrally located with regard to the first and second counterbores and the first opening. The second passage 60 has a threaded portion adjacent the opposite end. It should be noted that the second passage 60 is connected to the first passage 56 by means of an opening 58 which provides flow communication between passages 56, 60. The first passage 56 additionally communicates with cylindrical passage 36 by means of two spaced apart parallel channels 62, 64 with the opening 58 positioned in between the channels 62, 64 for a purpose to be described herein later.

An inline filter 68 is suitably secured within the passage 60. Furthermore, the passage 60 is suitably connected by conventional fastener means to the intake manifold means 4 by a conduit 16. The inline filter 68 is of conventional design and one such suitable filter is part number 36970 by the Nylon Filter Corporation.

The slide valve means 70 includes a cylindrical member 72 having one end 74 and an opposite end 76. A first opening 78 extends from the opposite end 76 through the one end 74 of the cylindrical member 72. A first counterbore 79 extends from the opposite end 76 towards the one end 74 and is centrally located with respect to the first opening 78 for flow communication therewith. The one end 74 is formed with a first outer diameter 75 which is greater than the outer body diameter of the cylindrical member 72. The opposite end 76 is formed with a second outer diameter 77 which is greater than the first outer diameter 75. The slide valve means 70 is inserted into the passage 56 such that the first outer diameter 75 slides within the first counterbore 53 and the second outer diameter 77 slides within the second counterbore 54. A first seal means 71 is provided in a groove in the first outer diameter 75 and a second seal means 73 is provided in a groove in the second outer diameter 77 for providing a pressure seal therebetween for a purpose to be described later on herein. A biasing member 67 such as a helical coil spring is inserted into the first counterbore 79 and one end of the biasing member 67 abuts against the bottom of the counterbore 79. The cap member 66 is threadably engaged to the third counterbore 55 and abuts against the other end of the biasing member 67 so as to bias the slide valve means 70 toward the bottom of the first counterbore 53. The cap member is threadably engaged to the third counterbore 55 to permit adjustment of the cap member relative to the bottom of the first counterbore 53 so that the biasing force of the biasing member 67 may be adjusted for a purpose to be described later on herein.

The fuel flow controlling means 80 includes a shaft 82 having one end 84 and an opposite end 86. The one end 84 of the shaft 82 has an apertured slot 85 formed therein to control the movement of the shaft 20 of the governor means 18 which controls the fuel injection control means 2. The apertured slot 85 thus provides a lost motion mechanism to permit the shaft 20 to move from one end 101 to the opposite end 102 of the slot 85 in order to control the fuel control means 2 between an idle fuel flow rate and a first maximum fuel flow rate. Thus, the shaft 20 is permitted to move within the slot 85 when the governor means 18 adjusts the fuel flow rate for engine speed as is well known in the fuel control and engine governor prior art. The shaft 82 further has a first outer diameter 87 adjacent to but spaced away from the aperture slot 85. Adjacent to the first outer diameter 87 and extending towards the opposite end 86 is a second outer diameter 88 which is smaller than the first outer diameter 87. An annular piston member 90 having an inside diameter of 91 and an outer diameter 92 is disposed over the second outer diameter of the shaft 82 so as to abut against shoulder 89 between the first outer diameter 87 and the second outer diameter 88. The annular piston member 90 is fixedly attached to the shaft 82 by means of a retainer ring 93 mounted in a suitable groove 94 adjacent to the piston member 90. A second groove 95 is formed in the shaft 82 so as to be disposed between the first groove 94 and the opposite end 86. Finally, the opposite end 86 of the shaft 82 is formed with helical threads 96. The shaft 82 with the annular piston member 90 disposed thereon is then inserted into a cylindrical passage 36 of the housing 30. The one end 84 of the shaft 82 is inserted through the opening 44 in the web portion 42 of the housing 30.

An adjustable piston stop annular member 97 has an inner diameter 98 and an outer diameter 99. The outer diameter 99 is formed with helical threads 89 to engage the helical threads 39 formed in the cylindrical passage 36 adjacent to the one end 38. The second outer diameter 88 of the shaft 82 extends through the inner diameter 98 of the adjustable stop annular member 97. The adjustable stop annular member 97 further has an annulus 83 adjacent to the second outer diameter 88 of the shaft 82 and adjacent the second groove 95 for a purpose to be described later on herein. A second retainer ring 81 is then inserted into the second groove 95.

An annular collar member 26 having an inner diameter 27 is then disposed on the second outer diameter 88 of the shaft 82 so as to abut the second retainer ring 81 as shown in FIG. 3. The outer diameter 28 of the annular collar member 26 is larger than the diameter of the annulus 83. The inner diameter 27 of the annular collar member 26 is formed with a close but sliding fit over the second outer diameter 88 of the shaft 82. A threaded stop nut member 22 threadably engages the helical threads 96 near the opposite end 86 of the shaft 82. A first helical biasing member 25 is disposed over the second outer diameter 88 of the shaft 82 so as to abut at one end the annular collar member 26, and at the other end abut against the threaded stop nut member 22. Thus, the collar member 26 is biased away from the opposite end 86 of the shaft 82.

A lock nut adjuster member 46 having helical threads 49 on its outer diameter 48 engages the helical thread 39 of the housing 30. The lock nut adjuster member 46 further has an inside diameter 47 which permits the shaft 82 to extend therethrough. A second helical biasing member 23 which is larger in diameter than the first helical biasing member 25 is disposed with one end adjacent the outer diameter 28 of the annular collar member 26 and with its opposite end disposed against the lock nut adjuster member 46. Thus, the shaft 82 slides axially along the cylindrical passage 36 from a second predetermined position wherein the piston member 90 abuts against the web portion 42 of the housing, as shown in FIG. 4, to a first predetermined position whereby the piston member 90 abuts against the adjuster stop annular member 97 as shown in FIG. 5. Thus, a cavity 35 is formed between the web portion 42 and the piston member 90 and a cavity 37 is formed between the piston member and the adjustable stop annular member 97.

OPERATION

In operation, exhaust gas flow in passage 15 spins the turbine 11 to drive the compressor 12 through shaft 13 so as to pressurize intake manifold means 4 through conduit 14 and thus produce greater gas flow out of the engine 8 as compared to the gas flow out of naturally aspirated engines. When an operator demands power from the internal combustion engine with turbocharger, either through throttle means 19 or governor means 18, fuel injector control means 2, responding to the means 19 or means 18, increases fuel flow into the engine 8. This causes the exhaust gas temperature to increase initially, which is used to accelerate the turbocharger to a higher rotational speed. The turbocharger will then produce more air flow at a higher pressure, resulting in more internal engine power. Conversely, if the operator demands less power, which causes the throttle means 18 to cause the fuel injection control means 2 to reduce the engine fuel flow, results in a lower exhaust temperature from the engine and the turbine reduces its rotational speed which causes a decrease in pressure out of the compressor portion 12 of the turbocharger. The lower turbocharger rotational speed results in decreased air flow and air pressure into the internal combustion engine which in turn lowers engine boost.

It is inherent in the design of a turbocharger, that the volume of air fed into the engine cylindrer (not shown) falls off as the speed of the turbocharger is reduced. Since the turbocharger is driven by the engine exhaust gases and with the engine 8 operating at low engine speeds and at a low output power, the turbocharger speed will be reduced and therefore, the volume of air and intake air manifold pressure level will be reduced. Under these conditions, the maximum fuel flow rate to the engine must be restricted to prevent the emission of smoke and other harmful pollutants. On the other hand, with the engine 8 operating at maximum engine speed and a demand for maximum output power, the turbocharger speed will be increased and, therefore, the volume of air and intake air manifold pressure level will be increased. Under these conditions, the maximum fuel flow rate to the engine must be increased to permit the engine 8 to generate maximum output power. Thus, the control overboost device 100, according to my invention, provides an automatic control of the maximum fuel flow rate as a function of the intake air manifold pressure generated by the turbocharger. Therefore, below a first predetermined intake air manifold pressure level, the maximum fuel flow rate to the engine is restricted to a first predetermined maximum fuel flow rate. On the other hand, as intake air manifold pressure level increases, the maximum fuel flow rate to the engine is increased. Thus, at a second predetermined intake air manifold pressure level, the fuel flow rate is increased to a second predetermined maximum fuel flow rate which is greater than the first predetermined maximum fuel flow rate. The control overboost device 100 also provides an automatic control of the maximum fuel flow rate when the intake air manifold pressure is above the second predetermined intake air manifold pressure level. Therefore, when the intake air manifold pressure is above the second predetermined intake air manifold pressure level, the maximum fuel flow rate is reduced to a third maximum fuel flow rate which is less than the first predetermined maximum fuel flow rate. The third maximum fuel flow rate corresponds to the idle cut-off fuel flow rate which supplies only enough fuel to idle the engine 8. This reduces the volume of the exhaust gases to the turbine 11 thereby reducing the volume of air and the intake air manifold pressure below the second predetermined intake air manifold pressure to protect the engine 8 from an overboost condition. When the intake air manifold pressure drops below the second predetermined intake air manifold pressure, the device controls the maximum fuel flow rate between the first maximum fuel flow rate and the second maximum fuel flow rate as discussed previously. The operation of the device 100 will now be discussed in detail.

When an operator demands more power, as previously discussed, the turbocharger produces more air at a higher pressure. This higher pressure, at the intake manifold means 4 is sent through channel 16 into the control overboost device 100 of the present invention. The slide valve means 70 having a pressure seal on each end is urged by the biasing member 67 to a first predetermined axial position towards the opposite end of the body portion 50 as is shown in FIG. 3. In the first predetermined axial position of the slide valve means 70, the manifold pressure flows into the control overboost device 100 through conduit 16, into passage 60 through opening 58, and through cavity 56, into the channel 62 which in turn causes the intake manifold pressure to flow into the passage 36 and cavity 37 of the fuel flow controlling means 80. The intake manifold pressure in cavity 37 acts on the first face of the piston member 90 which is spring biased to a first position centrally located in the housing 30 between the one end 38 and the opposite end 40 by the first helical biasing member 25 and the second helical biasing member 23 acting on the shaft 82 through the retainer ring 81 and adjuster stop annulus member 97. As the intake air manifold pressure increases by the action of the turbocharger, between a first predetermined pressure level and a second predetermined pressure level, the piston member 90 causes the shaft 82 to translate axially in the passage 36 towards the opposite end 40 of the housing and thereby permitting the shaft 20 of the governor means is to move correspondingly in the slot 25 to actuate the fuel injector means 2 to permit increasing the maximum fuel flow between a first predetermined maximum fuel flow rate and a second predetermined maximum fuel flow rate to the engine 8 as a function of increasing manifold pressure. When the intake manifold pressure decreases between the second predetermined pressure level and the first predetermined pressure level, the shaft 82 is translated towards the first position, this is between the one end 38 and the opposite end 40, which decreases the maximum fuel flow to the engine 8 towards the first maximum predetermined fuel flow rate. In the preferred embodiment, the first predetermined pressure level is by way of nonlimiting example 0 psig.

However, when the intake manifold pressure increases to above the second predetermined level, as by way of nonlimiting example to a pressure level above 12 psi, the slide valve means 70, overcomes the force in the biasing member 67 and moves towards the opposite end of the body portion 50. The slide valve thus diverts the intake manifold pressure from flowing into passage 36 through channel 62 and causes the intake manifold pressure to flow into passage 36 through channel 64 and into cavity 34, thus driving the piston member 90 to the one end 38 of the housing 30. This action causes the shaft 82 to move to the right hand side of FIG. 5 and moves the shaft 20 in the slot 85 to cause a decrease in the maximum fuel flow to the third maximum fuel flow rate.

As can be appreciated by those skilled in the art, the higher cylinder pressures in the engine 8 caused by the turbocharging, produces increased structural stresses within the engine 8. To limit these structural stresses in the engine, it has been found necessary to reduce fuel flow when the turbocharger provides boost to the intake manifold pressure above a second predetermined level, as for example by way of nonlimiting example above 12 psig. Such conditions can occur when the turbocharger dump valve fails to open. To prevent this occurrence, the overboost device 100, as soon as it senses an intake air manifold pressure above the second predetermined level, causes the shaft 82 to translate axially from the second position, that is, left hand side in FIG. 4, to the first position to the one end 38 of the housing 30, that is, the right hand side of FIG. 5. This occurs because the slide valve means 70, in response to the increased pressure level, overcomes the biasing forces of member 67 to cause the cylindrical member 72 to translate in the passage 56 from a first predetermined axial position to a second predetermined axial position towards the opposite end of the body portion 50, that is, towards the left hand side of FIG. 5. When the slide valve means 70 translates towards the one end, that is the left hand end, the intake manifold pressure is transmitted through channel 64 into the cavity 35. At the same time, cavity 37 is vented to atmosphere by means of channel 62 which is now connected to the first opening 52 which communicates to the atmosphere. As this occurs, the piston member 90 causes the shaft 82 to translate axially to the one end 38 of the housing 30. This causes the throttle shaft 20 to cause the fuel injection means 2 be moved to a third maximum predetermined fuel flow rate or idle cut-off fuel flow rate so that the fuel flow to the engine is significantly reduced. Since the fuel flow is significantly reduced, this results in a lower exhaust temperature at the turbine inlet and a corresponding decrease in compressor discharge pressure and thus a decrease in the intake air manifold pressure.

As the intake manifold pressure falls below the second predetermined level, the slide valve means 70 is urged towards the opposite end of the body portion 50 to the first predetermined axial position so that the intake manifold pressure is once again transmitted through channel 62 and thence into cavity 37 to cause the piston member 90 to move from the right hand end position in FIG. 5 towards the opposite end 40 in the housing 30. Thus, the device 100 is automatically reset to increase maximum fuel flow from the third maximum fuel flow rate to a first or second maximum fuel flow rate depending on throttle position and in response to increased intake air manifold pressure after the pressure level in the intake manifold means falls below the second predetermined intake manifold pressure level.

Those skilled in the art will recognize that the control device 100 according to my invention may be used with both compression ignition engines or spark ignition engines and that the device may be advantageously used with two or four cycle engines as the case may be. Furthermore, the device 100 can be adjusted to respond to various overboost conditions by increasing or decreasing the biasing forces in the slide valve means 70 by adjusting the cap member 66. In addition, the axial movement of the shaft 82 may be adjusted by increasing or decreasing the sensitivity of the first helical biasing member 25 by adjusting the nut member 22. In addition, the adjustable stop annular member 97 may be adjusted along the helical threads 96 to increase or decrease the axial movement of the piston member in the cavity 36 as desired.

While the invention has been described with a preferred embodiment, it will be understood that it is not intended to limit the invention to that embodiment. On the contrary, it is intended to cover all alternatives, modifications and equivalents as may be included within the spirit and scope of the invention as defined by the appended claims.

What is claimed is:

1. A fuel flow regulating device for internal combustion engines having intake manifold means, turbocharging means, connected to said intake manifold means, for increasing pressure in said intake manifold means, fuel control means, mounted adjacent to said intake manifold means and operatively connected to internal combustion engine, for regulating fuel flow to said internal combustion engine, governor means, connected to said fuel control means in response to a signal responsive to engine speed and engine power and operator actuating means, connected to said fuel control means, for controlling said fuel control means from first fuel flow rate to a second fuel flow rate in response to an operator signal and intake manifold pressure, said fuel flow regulating device comprising:

a housing having first cylindrical body portion and second body portion mounted to said first cylindrical body portion, said first cylindrical body portion having one end, an opposite end and portions defining a cylindrical passage extending from said one end toward said opposite end, said opposite end having a web portion extending across said cylindrical passage, said web portion having a portion defining an opening centrally disposed with said cylindrical passage for flow communication therebetween, said second body portion having one end, an opposite end and portions defining a first passage extending from said one end towards said opposite end, said first passage including a first opening through said opposite end, a first counterbore adjacent to said first opening and centrally disposed therewith, a second counterbore adjacent to said first counterbore and centrally disposed therewith, said first counterbore further being larger than said first opening and interposed said first opening and said second counterbore, said second counterbore further being larger than said first counterbore and extending from said one end to said second counterbore, said housing further having portions defining a first channel extending from said cylindrical passage in said first cylindrical body portion to said second counterbore in said second body portion for flow communication therebetween, and a second channel extending from said cylindrical passage in said first cylindrical body portion to said first counterbore in said second body portion;

a conduit connecting said intake manifold means to said first counterbore for flow communication therebetween;

slide valve means, slidably mounted in said passage in said second body portion, for translating axially in said passage from a first predetermined axial position to a second predetermined axial position in response to increasing intake manifold pressure such that above a second predetermined intake manifold pressure, said slide valve means translates axially to said second predetermined axial position to connect said first channel with said intake manifold pressure means and such that at and below said second predetermined intake manifold pressure, said slide valve means translates axially to said first predetermined axial positions to connect said second channel with said intake manifold pressure means;

fuel flow controlling means, slidably mounted in said first cylindrical passage, for controlling the maximum fuel flow rate from said fuel control means to said internal combustion engine in response to intake manifold pressure such that when said slide valve means is in said first predetermined axial position, said fuel flow controlling means increases maximum fuel flow in response to increasing intake manifold pressure from a first predetermined maximum fuel flow rate when said intake manifold is at a first predetermined intake manifold pressure, to a second predetermined maximum fuel flow rate when said intake manifold pressure is at said second predetermined intake manifold pressure and such that when said slide valve means is in said second predetermined axial position, said fuel flow controlling means decreases the fuel flow to a third predetermined maximum fuel flow rate in response to increasing manifold pressure when said intake manifold pressure above said second predetermined intake manifold pressure so as to override said governor means and to override said operator actuating means to protect said internal combustion engine from overboost of said engine by said turbocharger means.

2. A fuel flow regulating device as claimed in claim 1, further comprising:

means, interposed said conduit and said first counterbore of said second body portion, for filtering the intake manifold pressure before entering said housing.

3. A fuel flow regulating device as claimed in claim 1, wherein said slide valve means further comprising:

a cylindrical member slidably mounted in said passage of said body portion of said housing, said cylindrical member having one end, an opposite end, an outer diameter between said one end and said opposite end, and portions defining a first counterbore centrally disposed in said cylindrical member and extending from said opposite end towards said one end, said one end having a first outer diameter larger than said outer diameter and disposed in said first counterbore of said second body portion and first seal means for providing a pressure seal between said first outer diameter and said first counterbore of said second body portion, said opposite end having a second outer diameter larger than said first outer diameter and disposed in said second counterbore of said second body portion and second seal means for providing a pressure seal between said second outer diameter and said second counterbore of said second body portion; and means for biasing said cylindrical member in said passage towards said opposite end of said second body portion such that said one end of said cylindrical member is urged toward a first predetermined axial position when said intake manifold pressure is at and below said second predetermined intake manifold pressure and such that said one end of said cylindrical member is translated toward a second predetermined axial position when said intake manifold pressure is above said second predetermined intake manifold pressure.

4. A fuel flow regulating device as claimed in claim 1 wherein said cylindrical passage of said first cylindrical body portion further having helical thread means adjacent said one end thereof and wherein said fuel flow controlling means further comprises:

a piston member disposed in said cylindrical passage of said first cylindrical body portion, said piston member having an inner diameter and an outer diameter;

a shaft slidably mounted in said innter diameter of said piston member, said shaft having one end and an opposite end, said one end being slidably mounted in said opening of said web portion of said first cylindrical body portion, said opposite end of said shaft being centrally disposed in said cylindrical passage of said first cylindrical body portion, said one end of said shaft further being connected to said governor control means;

an adjustable stop member disposed in said cylindrical passage of said first cylindrical body portion, said adjustable stop member further having an outer diameter and an inner diameter, said outer diameter having helical thread means for cooperatively engaging said helical thread means of said cylindrical passage of said first cylindrical body portion, said inner diameter slidably engaging shaft, said opposite end of said shaft projecting through said adjustable stop member;

means for biasing said piston member in said cylindrical passage of said first cylindrical body portion towards said one end of said cylindrical body portion such that when said slide valve means is in said first predetermined axial position, said piston member and said shaft are urged towards a first predetermined position in said passage in between said web piston and said adjustable stop member, when said intake manifold pressure is below said first predetermined air intake manifold pressure, said piston member and said shaft sliding axially in said cylindrical passage with increasing intake manifold pressure from said first predetermined position to a second predetermined position adjacent said web portion when said intake manifold pressure is at said second predetermined intake manifold pressure and such that when said slide valve means is in said second predetermined axial position, said piston member and said shaft are urged to a third predetermined position adjacent said adjustable stop member to regulate maximum fuel flow from said fuel control means to a third maximum fuel flow rate, which is less than said first maximum fuel flow rate.

5. A fuel flow regulating device as claimed in claim 3 further comprising:

means for adjusting said biasing means on said cylindrical member.

6. A fuel flow regulating device as claimed in claim 4 further comprising:

means for adJusting said biasing means on said annular disc.

7. A fuel flow regulating device as claimed in claim 1 wherein said second body portion of said housing further having portions defining a second passage adjacent to said first passage and extending from said opposite end toward said one end and further comprising:

filtering means, mounted in said second passage; and a conduit connecting said intake manifold means to said second passage for flow communication therebetween.

8. A fuel flow regulating device as claimed in claim 7 wherein said second body portion further having portions defining an opening connecting said second passage with said first counterbore for flow communication therebetween.

* * * * *